ns and Patent Office 3,326,964
Patented June 20, 1967

3,326,964
TROPOLONE METHOXYBENZOATE
Lorraine Guy Donaruma, Potsdam, N.Y., assignor to Research Corporation, New York, N.Y., a corporation of New York
No Drawing. Filed Aug. 2, 1965, Ser. No. 476,737
2 Claims. (Cl. 260—473)

This invention relates to tropolone compositions. In one specific aspect, it relates to methoxybenzoate esters of tropolone.

The seven-membered ring compound 2,4,6-cycloheptatrien-2-ol-1-one, better known as tropolone, is representative of a class of compounds known as the tropolones. These compounds exhibit quasi-aromatic activity and undergo nuclear substitution in a manner somewhat analogous to compounds of the benzene series. While the carbonyl group of tropolone compounds resists normal ketone reactions, the hydroxyl group undergoes acylation and can be esterified, for example, with methoxybenzoyl halides.

It is an object of the present invention to provide a novel class of tropolone methoxybenzoate esters useful as antimalarials.

The methoxybenzoate esters of the present invention are most conveniently prepared by the reaction of a methoxybenzoyl halide, such as anisoyl chloride, with the corresponding tropolone compound as its sodium or potassium salt. Preferably, the acylation is effected under anhydrous conditions and in the presence of a solvent. Pyridine is particularly suitable for use as the solvent, alone or in conjunction with an aromatic hydrocarbon solvent.

The assay system used was designed to give quantitative evaluations of the test compounds both from the standpoint of host toxicity and antimalarial effect. This system is based on comparisons of responses to test compounds by *Plasmodium berghei* malaria in mice as expressed in maximum survival times and the survival times of untreated controls. Thus, compounds noted as active produce increases in the survival times of the treated animals that are significant when compared with the survival times of untreated controls. Since an established disease is less sensitive to treatment than a disease in the early stages of development, treatment is withheld until the parasitemia is relatively high in order to insure a more reliable assay of activity and the selection of appropriate compounds for intensive preclinical studies.

Utilizing young non-inbred ICR/Ha Swiss mice and a standard inoculum of *Plasmodium berghei*, it is possible to produce a uniform disease fata to 100% of untreated animals within 6 to 8 days. The mean survival time of more than 2000 consecutive controls was 7.1 (SD±0.49), and the mean survival time of 48 consecutive control groups (averaging 28 animals per group) varied from 6.1 to 8.0 days.

The making of the compositions of the present invention and methods for their use as antimalarials are illustrated by means of the following representative examples:

In a three-necked flask equipped with a mechanical stirrer, was placed 10 grams (0.083 mole) of tropolone, 14 grams of dry pyridine, and 150 milliliters of dry benzene. An equimolar amount (14.6 grams) of anisoyl chloride was added dropwise with stirring. Stirring was continued for one hour after the addition of anisoyl chloride was complete. The reaction mixture was washed with water, dilute hydrochloric acid, water, and finally dried over anhydrous calcium chloride. The benzene was evaporated off leaving 18.7 grams or an 88% yield of crude product. Recrystallization from ethanol gave tropolone anisoate as white needles a M.P. 147–148° C.

Analysis.—($C_{15}H_{12}O_4$). Calculated: C, 70.30; H, 4.72. Found: C, 70.33; H, 4.79.

Infrared data ($cm.^{-1}$).—760s, 775m, 790w, 850s, 875w, 945w, 1010m, 1020s, 1062s, 1120m, 1140s, 1170s, 1180m, 1250s, 1275s, 1385m, 1425m, 1435w, 1460m, 1510s, 1575s, 1605s, 1630m, 1725s, 2830w.

The test animals employed weighed from 18 to 22 grams and were approximately of the same age. They were housed in metal-topped plastic cages and given a standard laboratory diet and water ad lib. The inoculated test animals received an intraperitoneal injection of 0.5 milliliter of a 1:100 dilution of heparinized heart's blood with a minimum of 90% parasitized cells drawn from donor mice infected one week earlier with *Plasmodium berghei*. The donor strain is maintained by weekly passages in separate groups of mice inoculated with a 0.5 milliliter of 1:500 dilution of heparinized heart's blood.

The test compound, tropolone anisoate, was administered as a suspension in oil. The single dose was given subcutaneously 72 hours after the mice are infected with *Plasmodium berghei*. At this time a 10–15 percent parasitemia has developed; the disease is well established but has not produced sufficient debility to alter the response of the host to toxic effects of the drug on test. The treated animals are kept under observation for 60 days. Survivors at the end of this period of time are considered as cured.

The tropolone anisoate was administered in graded dosages. The increase in survival time of the treated mice was compared with the compound's toxicity at higher dosages. (Mouse deaths prior to the sixth day are attributed to the toxic effect of the test compound.) On the basis of these tests, tropolone anisoate was determined to exhibit antimalarial activity. Obviously, the effective dosage range in a given animal will depend primarily on the species of animal being treated.

As discussed above, the tropolone nucleus may be substituted in a manner somewhat analogous to benzene. It is to be understood that tropolone methoxybenzoates bearing substituents such as halo, alkyl, methoxy and the like which do not alter the essential pharmacological activity of the tropolone methoxybenzoate ester are to be considered as coming within the scope of the present invention.

I claim:
1. Tropolone methoxybenzoate.
2. Tropolone anisoate.

No references cited.

ALBERT T. MEYERS, *Primary Examiner.*
JEROME D. GOLDBERG, *Assistant Examiner.*